Oct. 26, 1948.  G. V. WOODLING  2,452,277
TUBE COUPLING
Filed May 10, 1945
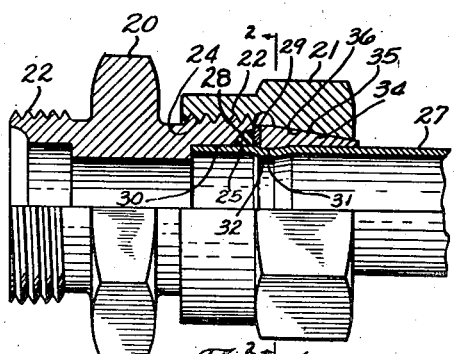
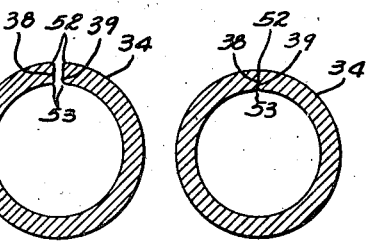
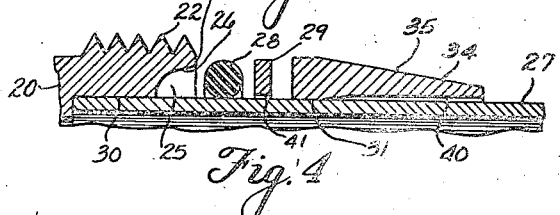
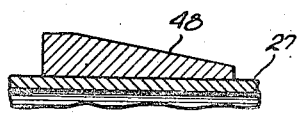
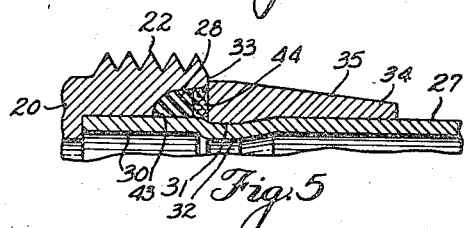
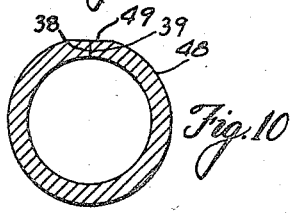
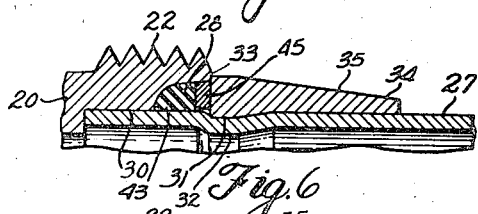
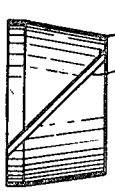
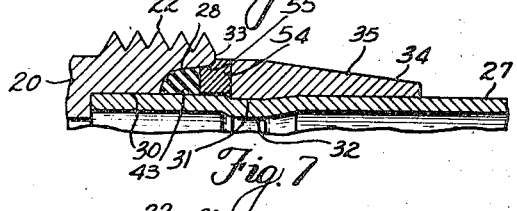
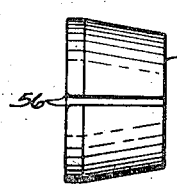
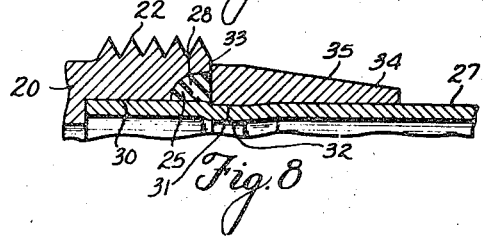
INVENTOR.
BY George V. Woodling.

Patented Oct. 26, 1948

2,452,277

UNITED STATES PATENT OFFICE 2,452,277

TUBE COUPLING

George V. Woodling, Cleveland, Ohio

Application May 10, 1945, Serial No. 593,006

9 Claims. (Cl. 285—122)

My invention relates in general to coupling devices and more particularly to coupling devices or members for tube fittings.

An object of my invention is the provision of a coupling device for attachment to a tube and for use with an annular sealing means in which the coupling device includes contractible means for gripping the tube and in which the contractible means constitutes non-extrusion means to prevent the sealing means from extruding along the tube.

Another object of my invention is the provision of a coupling device for attachment to a tube and for use with annular sealing means in which the coupling device includes a washer for enclosing the sealing means in a bore surrounding the tube and in which a contractible split collar abuts against the washer for preventing the sealing means from extruding past the washer along the tube.

Another object of my invention is the provision of a split collar for gripping the tube in which the internal surface of the split collar makes both a necking engagement with the tube and a frictional engagement with the tube.

Another object of my invention is the provision of a split collar which does not cut into the end of the fitting element against which it abuts or cut into the sleeve nut into which it fits.

Another object of my invention is the provision of a contractible collar which functions substantially as a lock washer to prevent the sleeve nut from becoming loose under vibration.

Another object of my invention is the provision of a coupling device which may be subject to a great deal of vibration without damaging the tubes.

Another object of my invention is the provision of a contractible means which is adapted to be contracted about the tube and which constitutes the only means of holding the tube against longitudinal movement relative to the coupling or fitting element.

Another object of my invention is to control the amount of the contractible movement of the contractible means which engage the tube.

Another object of my invention is to prevent the parts from being assembled in the wrong way.

Another object of my invention is the provision of a contractible means which "necks" the tube but does not cut the tube to weaken same whereby it may break off resulting from excess vibration.

Another object of my invention is the provision of contractible means which frictionally engages the tube in advance of the place where the contractible means "necks" the tube.

Other objects and a fuller understanding of my invention may be had by referring to the following description and claims, taken in conjunction with the accompanying drawing, in which:

Figure 1 is a longitudinal cross-sectional view of a tube fitting or coupling device embodying the features of my invention;

Figure 2 is a cross-sectional view of the split collar shown in Figure 1 taken along the line 2—2 thereof and showing only the split collar;

Figure 3 is a view similar to Figure 2 with the split collar shown in its retracted position;

Figure 4 is an exploded fragmentary view of the parts shown in Figure 1 prior to assembly;

Figure 5 is an enlarged fragmentary view showing a modified form of my invention;

Figure 6 is a modification of Figure 5;

Figure 7 is a further modification of Figure 5;

Figure 8 is an enlarged fragmentary view of Figure 1 with the washer omitted;

Figure 9 is a fragmentary view showing a modified form of a split washer;

Figure 10 shows a modification of the collar shown in Figures 2 and 3 in that the external surface is made flat next adjacent to the split end of the split collar;

Figure 11 is another modified form of the split collar showing the split cut upon a bias; and Figure 12 is a side view of the split collar shown in Figures 2 and 3.

With reference to Figure 1 of the drawing, my invention is shown as being applied to a tube fitting or coupling device comprising a coupling or fitting element 20, a tube 27 adapted to be connected thereto, and a sleeve nut 21 into which is mounted a split collar 34 adapted to engage the tube 27. The end portions of the fitting element 20 are identical and are provided with male threads 22. The sleeve nut 21 is provided with female threads 24 for engaging the male threads 22. The left-hand end of the fitting element, as shown in Figure 1, may be screwed into a cylinder block or valve or any other apparatus having a threadable opening. The fitting element 20 may be also employed as a coupling for connecting two pipes together, in which case there would be a pipe 27 shown on the left-hand end of the fitting element 20. The end portions of the fitting element are provided with a tube bore 30 into which the end of the tube may be freely inserted. As illustrated, the end portions of the fitting element 20 are provided with an enlarged bore 25 surrounding the tube for receiving a sealing ring 28 which may be of a rubber-like material. A metal washer 29 surrounds the tube and makes metal-to-metal contact engagement with the end surface 33 of the fitting element. The split collar 34 abuts against the metal washer 29 and after it is once contracted by the sleeve nut 21 constitutes non-extrusion means to keep the sealing means from extruding past the washer 29 along the tube. The external surface of the split collar 34 is provided with a tapering surface 35 which is engaged within an internal annular tapering surface 36 of the sleeve nut 21. Accordingly, as the sleeve nut 21 is threadably screwed onto the fitting element 20 the annular tapering surface or wall 36 contracts the split collar 34 about the tube 27. The split in the split collar is defined by the split ends 38 and 39 as shown in Figure 2. The sleeve nut 21 is screwed onto the fitting element until the split ends 38 and 39 come together such as shown in Figure 3 of the drawing. When the split ends 38 and 39 contact each other, they limit the contractible movement of the split collar. As illustrated in Figure 2, the split ends 38 and 39 meet with the external surface of the split collar and define junctures 52 which are rounded or otherwise relieved so that the junctures do not cut into the sleeve nut whereby if they were allowed to cut into the sleeve nut they may produce chips which would lodge between the split ends 38 and 39 to prevent their complete coming together under the compression of the sleeve nut. The split ends 38 and 39 also define junctures with the internal surface of the split collar and these junctures are indicated by the reference character 53, and they may also be rounded or relieved to prevent the juncture cutting into the tube whereby chips may thereby be formed to prevent the end surfaces 38 and 39 from completely contacting each other when the split collar is being contracted by the sleeve nut 21. During the tightening of the sleeve nut 21 relative movement may occur between the external surface of the collar and the internal surface of the sleeve nut or between the internal surface of the split collar and the external surface of the tube. It is during this relative movement between the parts that the cutting action takes place as above described. Therefore, in my invention I have provided for relieving the sharp corners or junctures to prevent this cutting. For aluminum tubing or other soft tubing the split collar may be made of steel or any other hard material. The relieving of the corners or junctures is particularly advisable when the tube or the sleeve nut is made of softer material than the split collar.

The internal surface of the split collar 34 is provided with an internal annular shoulder 31 which when the split collar is contracted makes a necking engagement with the tube 27. The necking of the tube is indicated by the reference character 32. The remaining internal surface of the split collar makes a good frictional engagement with the tube. The frictional engagement supports the tube in advance of the necking engagement whereby substantially all of the vibration is absorbed by the frictional engagement and very little is carried to the necking engagement. Tests show that this split collar will withstand a great deal of vibration whereby the tube will not break off under severe vibration tests. The Figure 1 is for a ½-inch tube and is drawn to double scale. The Figure 4 is drawn to four times the size for a ½-inch tubing. In actual practice, the internal annular shoulder 31 makes substantially ten thousandths of an inch reduction in the diameter of the tube 27 when the split collar is fully contracted. In other words, the split collar is reduced substantially ten thousandths of an inch in diameter as it is contracted by the sleeve nut 21 being screwed upon the fitting element 20. The gap between the split end surfaces 38 and 39 is substantially thirty two thousandths of an inch. The clearance indicated by the reference character 40 is substantially six or eight thousandths of an inch so that when the split collar is fully contracted about the tube it makes a good frictional engagement with the tube to the extent of compressing the tube approximately two to four thousandths of an inch to give a good support against vibration of the tube being carried up to the necking engagement 32. In actual practice, the washer 29 is substantially one thirty seconds of an inch in width and provides for enclosing the sealing ring 28 within the bore 25. A clearance will exist between the washer 29 and the tube and this clearance is indicated by the reference character 41 and may be in the neighborhood of two or three thousandths of an inch. When the rubber sealing ring 28 is subjected to high fluid pressures there is a tendency for the rubber to extrude along the tube through the clearance 41. In my invention the split collar, when contracted, blocks this extrusion as well as grips the tube whereby the tube may be anchored to the fitting element 20. The bore 25 which receives the rubber sealing ring 28 is provided with a tapering wall 26 whereby the deeper the bore the more the support for the male threads 22. The bore 25 extends back within the fitting element for a distance substantially equal to two threads on the fitting element. For a ½-inch tube the diameter of the rubber sealing ring is in the neighborhood of sixty-five to seventy thousandths of an inch and the mouth of the bore 25 is substantially fifty thousandths of an inch. The distance between the mouth of the bore 25 and the root of the threads 22 is substantially thirty thousandths of an inch.

From the above description it is noted that the dimensions are rather small and in order to provide support for the two end threads the sealing ring 28 is made larger in diameter than the mouth of the bore 25. The diameter of the washer 29 is slightly smaller than the root diameter of the threads 22 so that when the washer 29 presses against the end surface 33 the threads are subjected to a shearing action which threads therefore give support against the washer 29 from crushing the metal between the bottom of the threads and the tapering inner surface 26 of the bore 25. Inasmuch as the internal wall 26 of the bore tapers towards the tube as the bore recedes inwardly, an increased support is given to the metal between the bottom of the threads 22 and the bore 25, so as to avoid any collapsing of the head of the fitting element 20 as pressure is applied thereto by the washer 29 when the sleeve nut 21 is turned on tight to the fitting element 20. The washer 29 closes the rubber sealing ring 28 in the bore and protects the rubber sealing ring from being injured by the split collar 34.

In Figure 5 I show a modification of Figure 4, in that I employ a leather washer 44 which fits into the mouth of the elongated bore 43. In this construction, the forward end of the split collar abuts against the end surface 33 of the fitting element. In this embodiment of the invention, the split collar preferably has rounded corners 56 where the split ends 38 and 39 meet with the forward face of the split collar, see Figure 12. By rounding the corners such as indicated by 56 the split collar will not then cut into the end surface 33 of the fitting element. The rounded corners 56 are preferable where the fitting element 20 is made of aluminum or other soft material and where the split collar 34 is made of steel or other hard material.

In Figure 6 I show the use of a metal washer 45 in place of the leather washer 44 as employed in Figure 5. The metal washer 45 is disposed to snugly fit in the entrance of the bore 43 and thereby support the threads which are substantially axially co-extensive with the bore 43. In Figure 7 the washer 54 is provided with a stepped shoulder having a tapering or sloping surface 55 which is adapted to wedge into the entrance of the bore 43. The stepped shoulder has an outwardly extending surface which abuts against the end surface 33 of the fitting element 20. When the washer 54 is pressed snugly against the end of the fitting element, it tends to resist rotation as the sleeve nut 21 is drawn up tight on the fitting element. Inasmuch as the left-hand end of the split collar abuts against the washer 54 and makes frictional engagement therewith, a situation is set up whereby the split collar 34 is also disposed not to rotate about the tube 27 when the sleeve nut is turned on tight to the fitting element. In other words, the washer 54 serves to frictionally anchor the split collar to the end of the fitting element whereby when the sleeve nut is turned onto the fitting element, relative movement occurs between the outer surface of the split collar and the inner surface of the sleeve nut instead of causing the split collar to twist the tube. In this manner, the tendency to twist the tube 27 is relieved. The washer 54 since it snugly fits into the entrance of the bore 43 aids to support the threads which are axially co-extensive with the bore 43.

In Figure 8, the split collar abuts directly against the end surface 33 of the fitting element and no washer is employed. The abutting of the left-hand end of the split collar against the end surface 33 of the fitting element tends to resist rotation of the split collar whereby relative movement occurs between the split collar and the sleeve nut when the sleeve nut is turned onto the fitting element instead of having the split collar turn with the sleeve nut and twist the tube 27. The radial dimension of the bore at the entrance thereof is greater than one-half the diameter of the rubber sealing ring 28 but less than the full diameter of the sealing ring. Therefore, when pressure is applied to the sealing ring it is disposed to be gradually compressed and slip into the bore and make a good sealing engagement between the tube and the fitting element. The rounded corners 56 of the split collar protect the sealing ring 28 from being pinched as the split collar is contracted.

In Figure 9 I show a modification of the split collar in that the split collar 48 shown in Figure 9 does not have an internal shoulder for necking the tube. The entire internal surface makes a direct pressure contact with the tube for holding the tube firmly within the split collar. In actual construction, the axial length of the width of the shoulder 31 in the split collar 34 is approximately one-sixteenth of an inch. From the rear side of the shoulder a gradual taper is provided in order not to concentrate the stresses resulting from the necking of the tube. The axial width of the shoulder is such that it does not cut or damage the tube but has the property of reducing the diameter of the tube by producing a necking action as distinguished from a cutting action.

In Figure 10 the external surface as indicated by the reference character 49 is made flat whereby when the sleeve nut is rotated relative to the split collar the sharp edges which would otherwise be produced by the split ends meeting with the external surface is relieved. Therefore, the embodiment of the split collar shown in Figure 10 and indicated by the reference character 48 is such that no chips or other matter will be cut from the inside surface of the sleeve nut for lodging between the split ends of the collar and prevents the split collar from contracting to its full minimum extent. In Figure 11 the split collar 50 is arranged to have the split 51 cut on a bias whereby when the sleeve nut is turned onto the fitting element 20 the rotation of the split collar in a clockwise direction as viewed from the right-hand side thereof is such as not to cut into the end surface 33 of the fitting element since the angle between the split and the left-hand face of the split collar is greater than 90 degrees. The cutting action is most likely to occur when the fitting element 20 is made of aluminum or other soft material and when the split collar is made of steel. The employment of a split collar having a split cut on the bias tends to relieve the cutting action when the end of the split collar abuts directly against the end surface 33 of the fitting element. However, when a washer is employed the cutting action is not present since the washer abuts against the end surface 33 of the fitting element. The external tapering surface 35 of the split collar may be ground or polished in order to present a minimum of friction between the split collar and the internal surface of the sleeve nut. The lower the friction between the split collar and the sleeve nut the less the tendency of the split collar to twist the tube 27 as the sleeve nut is turned onto the fitting element. In all of the showings of the present application the split collar not only functions to hold the tube 27 but also functions to prevent non-extrusion of the sealing ring or means from the bore. Another provision present in the invention is that the sealing means allows the tube to have longitudinal movement with reference to the fitting element whereby the softer metal tubing may tend to grow, build up or gather in advance of the split collar. The presence of the collected material will give additional strength to the mechanical gripping action of the split collar on the tube. During the gathering stage, the tube may give or slightly slip longitudinally relative to the split collar. The gathering of the material as described above is made possible by reason of the fact that the sealing ring allows the tube to move longitudinally therein. My invention applies equally well to tubing smaller than ½ inch in diameter or for tubing larger than ½ inch in diameter. For tubing smaller than ½ inch in diameter the dimensions of the bore and the rubber sealing ring are proportionately made smaller as well as the other parts of the assembly. Similarly, for tubing greater than ½ inch size the parts are made proportionately larger.

In my invention, the parts are such that they can not be assembled in the wrong direction. In addition, the split collar acts as a lock washer to keep the sleeve nut from coming loose.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including a washer and contractible means gripping the tube for connecting the tube to the fitting element, said washer surrounding the tube and making contact engagement with the end surface of the fitting element for enclosing the sealing means in the bore, said contractible means abutting against the washer and constituting non-extrusion means to prevent the sealing means from extruding past the washer along the tube.

2. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including a washer and contractible means gripping the tube for connecting the tube to the fitting element, said washer surrounding the tube and fitting in the bore for enclosing the sealing means in the bore, said contractible means abutting against the washer and constituting non-extrusion means for the sealing means.

3. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including a leather washer and contractible means gripping the tube for connecting the tube to the fitting element, said washer surrounding the tube and fitting in the bore for enclosing the sealing means in the bore, said contractible means abutting against the washer and said end surface and constituting non-extrusion means for the sealing means.

4. A coupling device for attachment to a tube and for use with annular sealing means, said coupling device comprising a hollow fitting element having a threaded end portion provided with an end surface, said end portion receiving the tube and having a bore surrounding the tube adjacent the end surface to receive said sealing means, a washer surrounding the tube and adapted to make contact engagement with the end surface of the fitting element, said washer enclosing the sealing means in the bore, and connecting means including a sleeve nut threadably engageable with the fitting element and having a split collar therein for connecting the tube to the fitting element, said sleeve nut and said split collar having engaging cam surface means for contracting the split collar about the tube, said split collar abutting against the washer and constituting non-extrusion means to prevent the sealing means from extruding past the washer along the tube.

5. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including contractible means gripping the tube for connecting the tube to the fitting element, said contractible means abutting against the end surface of the fitting element and constituting non-extrusion means to prevent the sealing means from extruding out of the bore.

6. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including contractible means gripping the tube for connecting the tube to the fitting element, said contractible means comprising at least a split collar having internal wall means for engaging the tube and for blocking extrusion of the sealing means from said bore, said internal wall means surrounding the tube and having at least a first portion and a second portion, said first portion having a smaller surface area than the second portion and making a necking engagement with the tube, said second portion surrounding and supporting the tube.

7. In a coupling device for attaching a tube to a fitting element, the improvement of connecting means for connecting the tube to the fitting element, said connecting means including at least a split collar having internal wall means for engaging the tube, said internal wall means having at least a first portion and a second portion, said first portion comprising an internal annular shoulder for necking the tube, said second portion surrounding and supporting the tube, said internal annular shoulder having a smaller surface area engaging the tube than said second portion.

8. A coupling device for attaching a tube to a threaded fitting element having an end and a bore extending from said end to receive the tube, means including a sleeve nut and split cam ring means contractible about said tube for anchoring the tube to the fitting element, said cam ring means and said end having annular opposed surfaces for resisting relative pressing forces between said cam ring means and the end of the fitting element, an internal annular groove having at least one wall in the fitting element extending outward from said bore, and seal means in the groove surrounding the tube and engaging said wall to seal between the tube and the fitting element independently of any mechanical pressure incident to the anchoring of the sleeve nut and cam ring means to the fitting element.

9. A coupling device for attaching a tube to a threaded fitting element having an end and a bore extending from said end to receive the tube, means including a sleeve nut and a split cam ring contractible about said tube and engaging the end of the fitting element for anchoring the tube to the fitting element, said cam ring and said end having annular opposed surfaces for making a surface-to-surface abuttable engagement with each other, an internal annular groove having at least one wall extending outwardly from the tube and defined by the cam ring, and seal means in the groove surrounding the tube and engaging said wall to seal between the tube and the fitting element independently of any mechanical pressure incident to the anchoring of the sleeve nut and cam ring to the fitting element.

GEORGE V. WOODLING.

REFERENCES CITED

The following references are of record in the file of this patent:

UNITED STATES PATENTS

| Number | Name | Date |
| --- | --- | --- |
| 1,295,106 | Bowlzer | Feb. 25, 1919 |
| 2,179,127 | Lauer | Nov. 7, 1939 |
| 2,412,664 | Wolfram et al. | Dec. 17, 1946 |

FOREIGN PATENTS

| Number | Country | Date |
| --- | --- | --- |
| 268,162 | Great Britain | Mar. 31, 1927 |
| 485,154 | Great Britain | May 16, 1938 |
| 783,870 | France | Apr. 15, 1935 |